(12) United States Patent
Kwon et al.

(10) Patent No.: US 7,214,727 B2
(45) Date of Patent: May 8, 2007

(54) SOLUTION CONTAINING CELLULOSE DISSOLVED IN N-METHYLMORPHOLINE-N-OXIDE AND HIGH TENACITY LYOCELL MULTIFILAMENT USING THE SAME

(75) Inventors: Ik-Hyeon Kwon, Seoul (KR); Soo-Myung Choi, Kyonggi-do (KR); Young-Soo Wang, Busan (KR); Sung-Ryong Kim, Daejon (KR); Jae-Shik Choi, Seoul (KR); Tae-Jung Lee, Kyonggi-do (KR); Seok-Jong Han, Kyunggi-do (KR); Myung-Woo Kim, Gyeongnam (KR)

(73) Assignee: Hyosung Corporation, Kyonggi-do (KR)

( * ) Notice: Subject to any disclaimer, the term of this patent is extended or adjusted under 35 U.S.C. 154(b) by 170 days.

(21) Appl. No.: 10/481,105

(22) PCT Filed: Oct. 24, 2003

(86) PCT No.: PCT/KR03/02250

§ 371 (c)(1),
(2), (4) Date: Dec. 18, 2003

(87) PCT Pub. No.: WO2005/001174

PCT Pub. Date: Jan. 6, 2005

(65) Prior Publication Data

US 2005/0154093 A1 Jul. 14, 2005

(30) Foreign Application Priority Data

| Jun. 30, 2003 | (KR) | ...................... | 10-2003-0043254 |
| Jun. 30, 2003 | (KR) | ...................... | 10-2003-0043255 |
| Jul. 25, 2003 | (KR) | ...................... | 10-2003-0051410 |
| Jul. 25, 2003 | (KR) | ...................... | 10-2003-0051411 |

(51) Int. Cl.
*C08L 1/00* (2006.01)
*C08L 1/02* (2006.01)
*C08K 5/35* (2006.01)

(52) U.S. Cl. ........................... 524/13; 524/96; 524/503
(58) Field of Classification Search .................. 524/13, 524/96, 503
See application file for complete search history.

(56) References Cited

U.S. PATENT DOCUMENTS 3,447,935 A 6/1969 Marley
4,142,913 A 3/1979 McCorsley, III et al.
4,144,080 A 3/1979 McCorsley, III
4,196,282 A 4/1980 Franks et al.
4,221,574 A 9/1980 Loggins, Jr. et al.
4,246,221 A 1/1981 McCorsley, III
4,255,300 A 3/1981 Franks et al.
4,416,698 A 11/1983 McCorsley, III
4,880,469 A 11/1989 Chanzy et al.
5,626,810 A 5/1997 Zikeli et al.
5,725,821 A 3/1998 Gannon et al.
5,747,125 A 5/1998 Markulin
5,826,798 A 10/1998 Schindler et al.
5,951,933 A 9/1999 Stall et al.
6,153,003 A 11/2000 Lee et al.
6,241,927 B1 6/2001 Mulleder et al.
6,677,447 B1 1/2004 Lee et al.
6,812,270 B2 11/2004 Lee et al.
6,902,804 B2 6/2005 Kwon et al.
2003/0225206 A1 12/2003 Lee et al.
2005/0019564 A1 1/2005 Kwon et al.
2005/0066646 A1 3/2005 Kwon et al.
2005/0154093 A1 7/2005 Kwon et al.
2005/0160939 A1 7/2005 Kwon et al.

FOREIGN PATENT DOCUMENTS

| GB | 2 374 326 A | 10/2002 |
| GB | 2 389 111 A | 12/2003 |
| KR | 2000-041342 A | 7/2000 |
| KR | 2001-038732 A | 5/2001 |
| WO | WO 94/06530 | 3/1994 |
| WO | WO 94/06530 A1 | 3/1994 |
| WO | WO 97/47790 | 12/1997 |

OTHER PUBLICATIONS

Yun-Jeong Seong et al.; "The Effects of PVA on the Properties of Cellulose/PVA Solution Blends in NMMO Hydrate"; Polymeric Materials: Science & Engineering; 2002; 86, pp. 167-168.

*Primary Examiner*—Ana Woodward
(74) *Attorney, Agent, or Firm*—Nixon & Vanderhye P.C.

(57) ABSTRACT

This invention relates to a method of preparing cellulose solution which is homogeneous at relatively low temperature, in which a small amount of cellulose powder or polyvinylalcohol is dissolved in the liquid-state, concentrated N-methylmorpholine-N-oxide (hereinafter, referred to as 'NMMO') so as to lower the solidifying temperature of NMMO, and then, the resulting solution and cellulose powder are fed into an extruder so as to be mixed, swollen and melted in the extruder.

9 Claims, 4 Drawing Sheets

SOLUTION CONTAINING CELLULOSE DISSOLVED IN N-METHYLMORPHOLINE-N-OXIDE AND HIGH TENACITY LYOCELL MULTIFILAMENT USING THE SAME

TECHNICAL FIELD

The present relates to a method of preparing cellulose solution which is homogeneous at relatively low temperature and, more particularly, to a method of preparing cellulose solution which is homogeneous at relatively low temperature, in which a small amount of cellulose powder or polyvinylalcohol is dissolved in the liquid-state, concentrated N-methylmorpholine-N-oxide (hereinafter, referred to as 'NMMO') to produce a solution, and then, the resulting solution and cellulose powder are fed into an extruder so as to be mixed, swollen and melted in the extruder.

The fiber manufactured by using the cellulose solution is excellent in mechanical strength and dimensional stability and may be usefully utilized as industrial filament fiber or reinforcing material of rubber-made products such as tire or belt.

Cellulose has a good chemical attraction, but is not soluble in the ordinary solvent because of its crystalline structure that is caused by intra- or inter-hydrogen bond of the main chain of the cellulose molecules. NMMO is most widely used as a solvent for dissolving the cellulose by breaking the crystalline structure.

BACKGROUND ART

A process of preparing cellulose fiber using NMMO as a solvent is widely used to produce articles made of cellulose such as film or fiber because the process is pollution-free process by recycling all the used solvent and the article such as film or fiber manufactured by the process has high mechanical strength. The process is disclosed in the U.S. Pat. No. 3,447,935 and so on.

U.S. Pat. Nos. 4,142,913, 4,144,080, 4,196,282 and 4,246,221 disclose a process for making a fiber in which cellulose is swollen in NMMO aqueous solution which contains less than 50% water, and then, the water in the resultant NMMO aqueous solution is distilled under reduced pressure so as to make crude spinning solution, followed by extruding into the fiber.

These processes, however, requires relatively long time so that the physical, chemical properties of the fiber made by the processes are deteriorated due to thermal-decomposition.

And these processes also requires relatively large amount of energy so that the cost of production is too high.

PCT WO 1994/06530 discloses a process for making cellulose solution by removing water using a thin-layer distilling apparatus. This process, however, has some disadvantages, in that an apparatus for implementing the process is too complicated and the production efficient is too low to make viscose cellulose solution.

U.S. Pat. No. 4,221,574 discloses a process for making fiber by swelling a cellulose sheet using liquid-state tertiary amine oxide containing 5 to 15% by weight water as solvent at 65 to 95° C., followed by agitating and heating, and then, spinning.

This process, however, couldn't obtain homogeneous cellulose solution due to a film formed on the pulp sheet.

U.S. Pat. No. 4,416,698 discloses a process for making fiber by feeding solid-state NMMO (not liquid-state) and cellulose pulp into an extruder, followed by agitating them, and then, spinning. This process, however, is not suitable for a mass production because there remain a great amount of powder particles which are not dissolved in a solution by using two kinds of powder.

PCT WO 1997/47790 discloses a process for making fiber in which fibril type cellulose powder and high concentration NMMO aqueous solution containing 5 to 20% by weight water at 50 to 130° C. instead of a cellulose pulp sheet are fed into a twin-screw type extruder, followed by mixing and melting them, and then, spinning.

This process, however, has some disadvantages in that since during the spinning, there remains a great amount of power particles which are not dissolved and impurities in the resultant solution, and hence a filter for removing them must be very frequently replaced. It makes the cost of production too high because of changing filters too often. And a great amount of powder particles which are not dissolved in the solution couldn't obtain homogeneous cellulose solution, which makes physical and chemical properties of the obtained fiber deteriorated.

U.S. Pat. No. 4,416,698 and PCT WO 1997/47790 disclose a process for making cellulose solution through mixing, swelling (paste) and melting processes in an extruder. These processes, however, has a disadvantage in that they don't fully dissolve the cellulose.

DISCLOSURE OF INVENTION

Accordingly, the present invention has been made in view of the above-mentioned problems and disadvantages, and it is an object of the present invention to provide a method of preparing cellulose solution which is homogeneous at relatively low temperature by dissolving 0.01 to 3% by weight of cellulose powder in the liquid-state, concentrated NMMO solvent so as to lower the solidifying temperature of the NMMO. It can be possible to feed the liquid-state NMMO into an extruder at relatively low temperature. Thereby, it can be possible to proceed the process at wide processing temperature and to produce cellulose solution which is homogeneous at relatively low temperature by swelling the cellulose powder and the NMMO solution at relatively low temperature so as not to form a film on the cellulose powder.

It is another object of this invention to provide cellulose fiber that has good flexibility and mechanical strength by using the cellulose solution that is homogeneous at relatively low temperature that can be lowering thermal-decomposition in the extruder when spinning.

To accomplish the foregoing objects, in accordance with the present invention, there is provided a method of preparing cellulose solution, comprising the steps of:

(A) dissolving 0.01 to 3% by weight of cellulose powder in the liquid-state, concentrated NMMO solvent to provide cellulose-containing N-methylmorpholine-N-oxide (NMMO) solution; and (B) feeding the cellulose-containing NMMO solution and the cellulose powder into an extruder having a screw to be subjected to dispersing, mixing, shearing, kneading, melting and measuring processes in the extruder so as to produce cellulose solution that is swollen and homogenized.

It is preferred that the cellulose solution is produced continuously without attaching an extra water-vaporizer to the extruder in the step (B).

It is also preferred that the cellulose powder used in the steps (A) and (B) has a particle size of less than 5,000 micrometer.

It is also preferred that the cellulose solution obtained by mixing, swelling and dissolving in the extruder in the step (B) contain 3 to 20% by weight of the cellulose with respect to the total weight of the cellulose solution.

It is also preferred that the NMMO solution in the step (A) contain 10 to 18% by weight of water with respect to the total weight of the NMMO solution.

It is also preferred that the cellulose-containing NMMO solution is fed into the extruder while being maintained at 40 to 90° C. in the step (B).

It is also preferred that the extruder used in the step (B) is twin-axis type extruder, and has 3 to 16 barrel or 12 to 64 L/D (length/diameter) of the screw so as to make NMMO solution and cellulose powder swollen and homogeneous.

It is also preferred that the extruder is operated with it maintained at the temperature ranging from 30 to 110° C.

It is also preferred that the extruder is operated at a revolving speed of 100 to 1,200 rpm.

It is also preferred that the cellulose powder mixed with other polymer(s) can be used in the steps (A) or (B).

According to the present invention, it is possible to lowering the solidifying temperature of NMMO solution by dissolving a small amount of a polymer which can be dissolved in the liquid-state, concentrated NMMO solvent in the place of the cellulose powder (pulp). According to the present invention, the preferred polymer is polyvinylalcohol.

In this invention, it is also possible to lower the solidifying temperature of NMMO solution by dissolving 0.1 to 10% by weight of polyvinylalcohol in the liquid-state, concentrated NMMO solvent.

By dissolving a small amount of polyvinylalcohol in the liquid-state, concentrated NMMO solvent, it is possible to lower the solidifying temperature of NMMO solution so that the NMMO solution can be fed into an extruder while being maintained in a liquid-state at relatively low temperature. Thereby, it is possible to produce cellulose solution that is homogeneous at relatively low temperature by swelling the cellulose powder and the NMMO solution at relatively low temperature so as not to form a film on the cellulose powder.

Also, it is possible to produce a cellulose article, more specifically, fiber having a good flexibility and mechanical strength by using the cellulose solution which is homogeneous at relatively low temperature, when spinning by lowering thermal-degradation in the extruder while being maintained at high temperature, the obtained fiber contains a small amount of polyvinylalcohol in the fiber and has a good anti-fibrilation and excellent adhesive property.

It is preferred that the polyvinylalcohol has a degree of polymerization in the range of 500 to 6,000 and a saponification value in the range of 80 to 99.9%.

BRIEF DESCRIPTION OF DRAWINGS

Further objects and advantages of the invention can be more fully understood from the following detailed description taken in conjunction with the accompanying drawings in which.

BEST MODE FOR CARRYING OUT THE INVENTION

Figure 1:
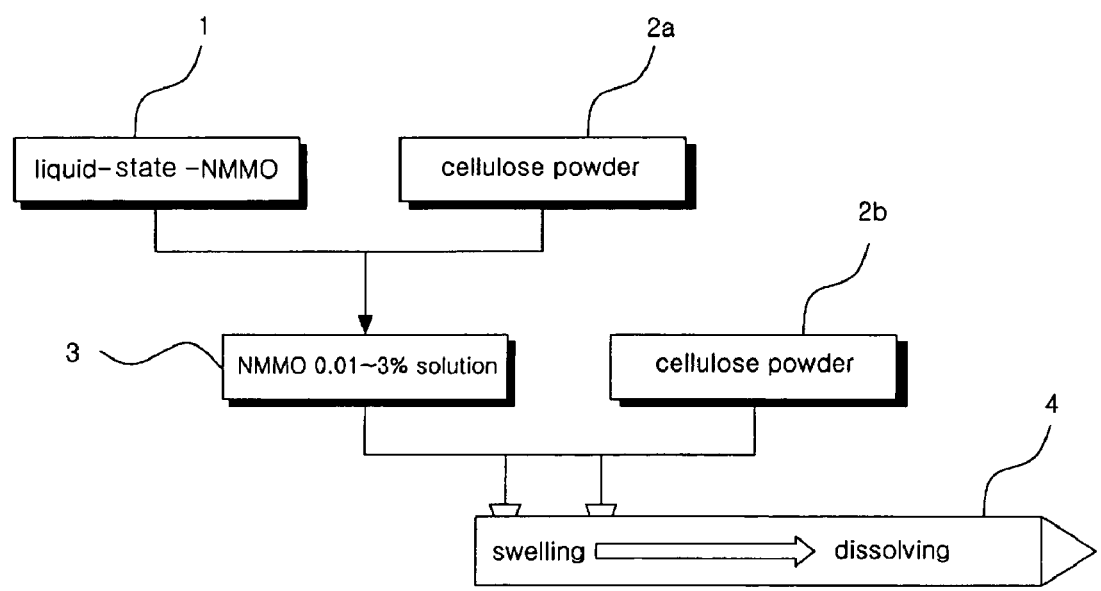
FIG. 1 is a block diagram illustrating an embodiment of the method of preparing cellulose solution that is homogeneous at relatively low temperature by dissolving a small amount of cellulose powder in NMMO solvent.

A method of preparing cellulose solution according to the present invention includes: (A) dissolving 0.01 to 3% by weight of cellulose powder in the liquid-state, concentrated N-methylmorpholine-N-oxide (NMMO) solvent to provide cellulose-containing NMMO solution; and (B) feeding the cellulose-containing NMMO solution and the cellulose powder into an extruder having a screw to be subjected to dispersing, mixing, shearing, kneading, melting and measuring processes in the extruder so as to produce cellulose solution that is swollen and homogenized.

Also, a method of preparing cellulose solution according to the present invention includes: (A) dissolving 0.1 to 10% by weight of polyvinylalcohol in the liquid-state, concentrated N-methylmorpholine-N-oxide (NMMO) solvent to provide polyvinylalcohol-containing NMMO solution; and (B) feeding the polyvinylalcohol-containing NMMO solution and cellulose powder into an extrude, and then mixing, swelling and dissolving in the extruder so as to produce cellulose solution.

It is preferred that the cellulose solution is produced continuously without mounting an extra water-vaporizer to the extruder in the step (B).

It is also preferred that the cellulose powder used in the steps (A) and (B) has a particle size of less than 5,000 micrometer, preferably 500 micrometer.

It is preferred that the polyvinylalcohol used in the step (A) has a degree of polymerization in the range of 500 to 6,000 and a saponification value in the range of 80 to 99.9%.

It is also preferred that the cellulose solution obtained by mixing, swelling and melting in the extruder in the step (B) contain 3 to 20% by weight of the cellulose with respect to the total weight of the cellulose solution.

It is also preferred that NMMO solution in the step (A) contain 10 to 18% by weight of water with respect to the total weight of the NMMO solution.

It is also preferred that the cellulose-containing NMMO solution is fed into the extruder while being maintained at 40 to 90° C. in the step (B).

It is also preferred that the extruder used in the step (B) is twin-axis type extruder, and has 3 to 16 barrel or 12 to 64 L/D (length/diameter) of the screw.

It is also preferred that the extruder is operated at the temperature in the range of 30 to 110° C.

It is also preferred that the extruder is operated at a revolving speed of 100 to 1,200 rpm.

It is also preferred that the cellulose powder mixed with other polymer(s) may be used in the steps (A) or (B).

Referring to Figures, we explain this invention more specifically.

Figure 2:
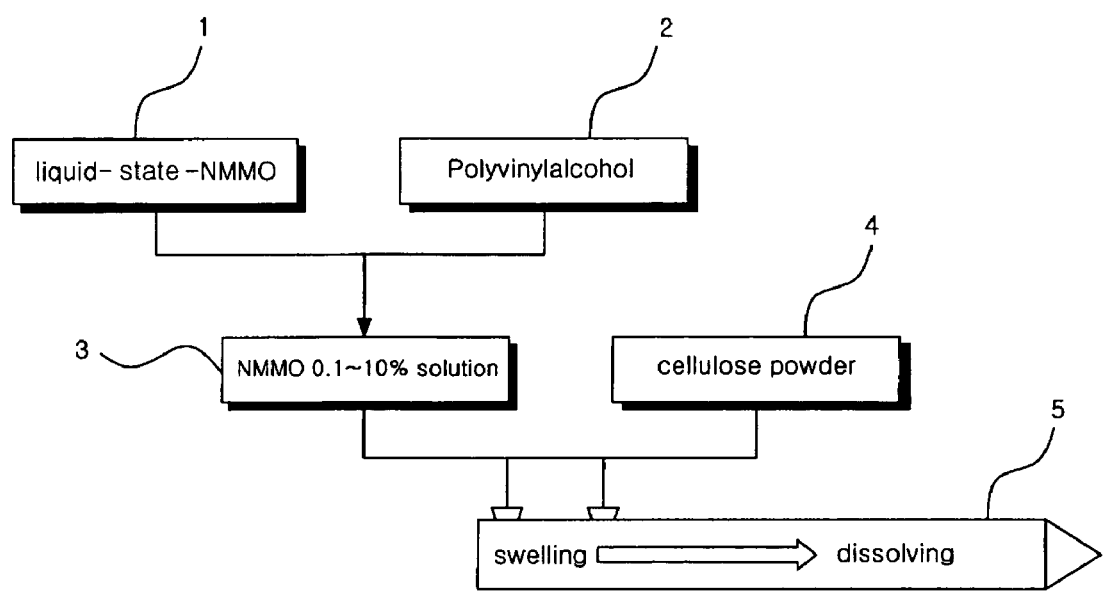
FIG. 2 is a block diagram illustrating an embodiment of the method of preparing cellulose solution that is homogeneous at relatively low temperature by dissolving a small amount of polyvinylalcohol in NMMO solvent.

FIG. 1 and FIG. 2 are examples of this invention, and they are block diagrams illustrating an embodiment of the method of preparing cellulose solution which is homogeneous at relatively low temperature by dissolving a small amount of cellulose powder or polyvinylalcohol in NMMO solvent.

In FIGS. 1 and 2, the cellulose powder (2a, 2b) is well pulverized by using a pulverizer having a knife to have a particle size of less than 5,000 micrometer, and more specifically, less than 500 micrometers.

If the particle size overs 5,000 micrometer, the powder will not dispersed and swollen uniformly in the kneader or extruder (4).

Firstly, a small amount of cellulose powder (2a) having a particle size of less than 5,000 micrometers is dissolved in the liquid-state, concentrated NMMO solvent.

In FIG. 1, the content of the cellulose powder (2a) in the liquid-state, concentrated NMMO solvent (1) is in the range of 0.01 to 5% by weight, and more specifically, in the range of 0.01 to 3% by weight.

If the content is less than 0.01% by weight, the cellulose powder will not be fully swollen, and if the content is more than 3% by weight, the viscosity of the NMMO solution (3) is too high to feed the NMMO solution into the extruder (4).

In accordance with this invention, the liquid-state, concentrated NMMO (1) is prepared by concentrating the 50% by weight of NMMO solvent to have 10 to 20% by weight water contents. It is not preferable to concentrate the NMMO solvent to have water content less than 10% by weight, it is not proper economically, and if the water content is more than 20% by weight, the solubility of the NMMO solvent is too lower.

The cellulose powder (2b) and the NMMO solution (3) containing a small amount of cellulose powder (2a) are fed into the extruder (4) maintained at the temperature in the range of 65 to 105° C. continuously, and then, mixed, swollen and melted in the extruder (4) to produce homogeneous cellulose solution.

The NMMO solution (3) containing a small amount of the cellulose powder (2a) can be fed into the extruder (4) by a geared pump or a screw-type feeder, and the cellulose powder (2b) can be introduced preferably into the extruder (4) by a screw-type feeder.

The content of the cellulose powder (2a) in the cellulose solution mixed, swollen and melted in the extruder (4) is in the range of 3 to 20% by weight, and more specifically, 9 to 14% by weight to the liquid-state, concentrated NMMO (1) according to the degree of polymerization of the cellulose powder.

If the content of the cellulose powder (2a) is less than 3% by weight, the physical and chemical properties of fiber cannot be obtained properly, and if the content of the cellulose powder is more than 20% by weight, the homogeneous solution cannot be obtained because the cellulose powder fully dissolved in the liquid-state NMMO solvent (1).

According to this invention, the extruder (4) used in the step (B) so as to produce a cellulose solution which is homogeneous at relatively low temperature is preferably twin-axis type extruder, and the twin-axis type extruder has 3 to 16 barrel or 12 to 64 L/D (length/diameter) of the screw. If the barrel is less than 3 or the L/D of the screw is less than 12, the time the cellulose solution pass through the barrel is too short so as to produce power particles which are not dissolved in the solution, and if the barrel is more than 16 or the L/D of the screw is more than 64, the screw of the extruder can be deformed because of hard stress acted to the screw.

According to this invention, the cellulose powder (2a, 2b) in the step (A) or (B) can be mixed with other polymer or additives. Polyvinylalcohol, polyethylene, polyethyleneglycol or polymethylmethacrylate can be used as the above polymer, and thickner, titanium dioxide, silica (silicon dioxide), carbon or ammonium chloride can be used as the additives.

In FIG. 2, the content of the polyvinylalcohol (2) to the liquid-state, concentrated NMMO (1) is in the range of 0.1 to 10% by weight, and more specifically, in the range of 0.5 to 3% by weight.

If the content of the polyvinylalcohol (2) is less than 0.1% by weight, it cannot be contributed to rise swelling of the cellulose powder against lowering temperature of the NMMO, and if the content of the polyvinylalcohol is more than 10% by weight, the cellulose powder in the NMMO solution (3) cannot be dissolved uniformly.

The degree of polymerization of the polyvinylalcohol using in this invention is in the range of 500 to 6,000, and more specifically, 1,000 to 4,000. If the degree of polymerization is less than 500, the effect to the physical and chemical properties of the cellulose fiber obtained thereby is too low, and if the degree of polymerization is more than 6,000, the solubility to the NMMO (1) and cellulose (4) can be lowered. The saponification value of the polyvinylalcohol using in this invention is in the range of 80 to 99.9%, and more specifically, 90 to 99.5%. If the saponification value is less than 80%, it cannot affect to anti-fibrilation of cellulose, and if the saponification value is more than 99.5%, the viscosity stability of the cellulose solution can be lowered.

According to this invention, as shown in FIG. 2, the cellulose powder (4) and the NMMO solution (3) containing a small amount of polyvinylalcohol (2) are fed into the extruder (5) maintained at the temperature in the range of 65 to 105° C. Continuously, and then, mixed, swollen and melted in the extruder (5) to produce homogeneous cellulose solution.

The NMMO solution (3) containing a small amount of the polyvinylalcohol (2) can be fed into the extruder (5) by a geared pump or a screw-type feeder, and the cellulose powder (4) can be introduced preferably into the extruder (5) by a screw-type feeder.

The content of the cellulose powder (4) in the cellulose solution mixed, swollen and melted in the extruder (5) is in the range of 5 to 20% by weight, and more specifically, 9 to 14% by weight to the liquid-state NMMO (1) according to the degree of polymerization of the cellulose powder.

Figure 3:
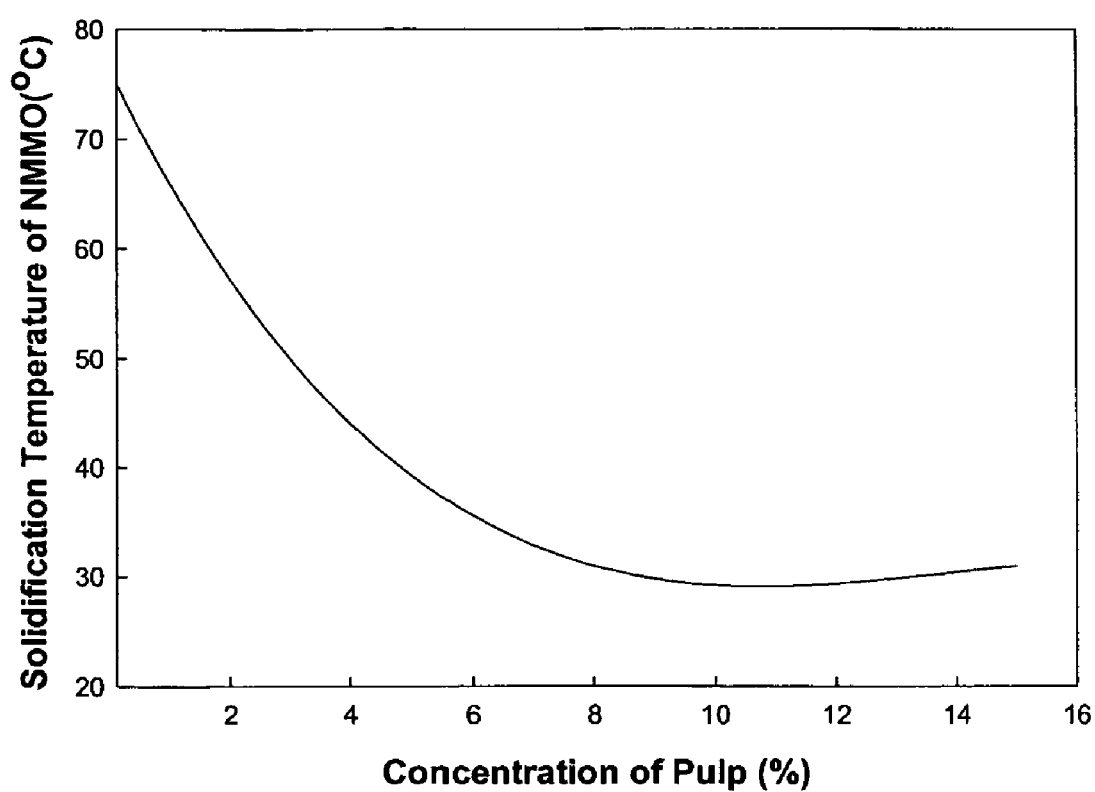
FIG. 3 is a graph illustrating the history of shift of the solidifying temperature of the NMMO solution versus the concentration of the cellulose pulp.

FIG. 3 is a graph illustrating the history of shift of the solidifying temperature of the NMMO solution versus the concentration of the cellulose pulp. In this figure, the solidifying temperature of the NMMO is greatly lowered from 75° C. to 30° C. by dissolving a small amount of cellulose (about 0.1 to 6% by weight).

Figure 4:
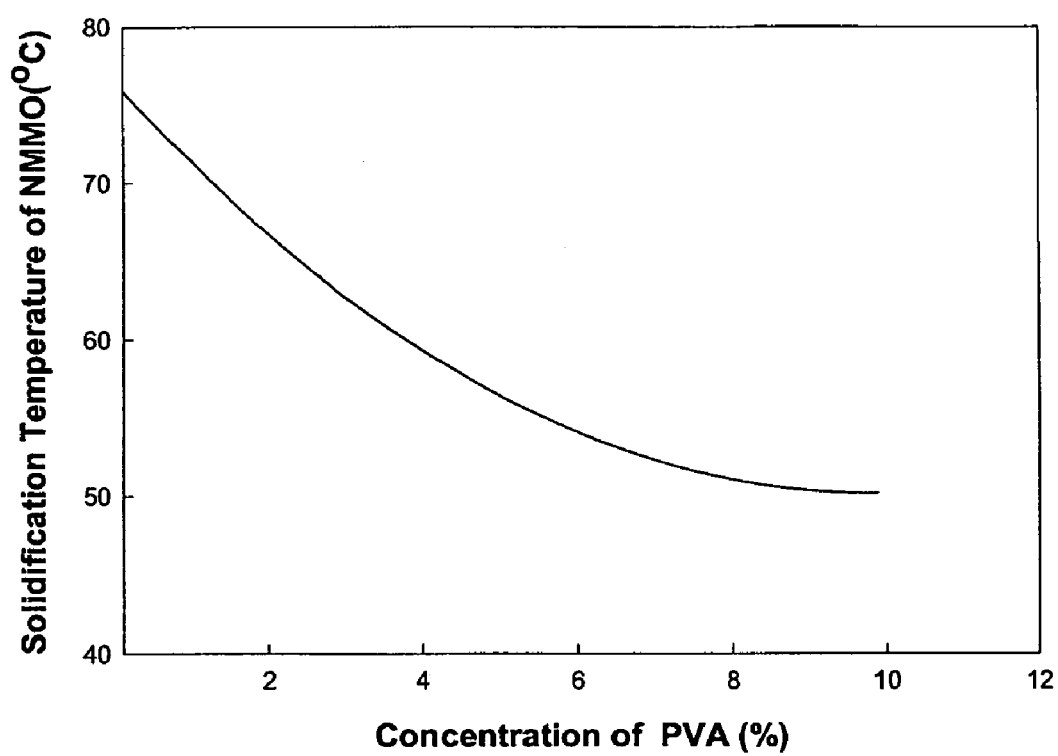
FIG. 4 is a graph illustrating the history of shift of the solidifying temperature of the NMMO solution versus the concentration of the polyvinylalcohol.

FIG. 4 is a graph illustrating the history of shift of the solidifying temperature of the NMMO solution versus the concentration of the polyvinylalcohol. In this figure, the solidifying temperature of the NMMO is greatly lowered from 75° C. to 50° C. by dissolving a small amount of polyvinylalcohol (about 0.1 to 6% by weight).

According to this invention, as described above, by dissolving a small amount of cellulose powder (2a) or polyvinylalcohol in the liquid-state, concentrated NMMO (1) so as to lower the solidifying temperature of the NMMO solution (3), it is possible to feed the NMMO solution (3) into the extruder (5) at relatively low temperature. Thereby, it can be possible to proceed the process at wide processing temperature and to produce cellulose solution which is homogeneous at relatively low temperature by swelling the cellulose powder (4) and the NMMO solution (3) at relatively low temperature so as not to form a film on the cellulose powder.

Hereinafter, this invention is described in detail with referenced to the following examples, but it is to be understood that the examples is solely for the purpose of illustration and do not limit the scope of this invention. In the following examples, the estimating method and the measuring method as following is used.

(a) The Degree of Homogeneousness of the Cellulose Solution

The estimation of the solubility of the cellulose powder obtained according to this invention is carried out as follows. The 12% by weight of cellulose powder dissolves in the NMMO monohydrate in the reaction vessel. And then, the number of the particles remained (not liquefied) in the area of 5×5 mm² of a slide glass which contains the sample through a polarization microscope is calculated.

(b) Weight Mean Degree of Polymerization (DPw)

The intrinsic viscosity [IV] of the dissolved cellulose is measured as follows. 0.5M cupriethylenediamine hydroxide solution in the range of 0.1 to 0.6 g/dl concentration obtained according to ASTM D539-51T is measured by using an Uberod viscometer at 25±0.01° C.

The intrinsic viscosity is calculated from the specific viscosity by using the calculation method of extrapolation and then Mark-Hauwink's equation to obtain the degree of polymerization.

$$[IV]=0.98\times10^{-2}DP_w^{0.9}$$

(c) The Physical and Chemical Properties of the Fibers Obtained to According to this Invention are Measured as Follows.

Mechanical strength at dry state: After drying at 107° C. for 2 hours, the mechanical strength is measured.

Mechanical strength at wet state: After conditioning at 25° C., 65RH (relative humidity) for 24 hours, the mechanical strength is measured.

(d) Estimation of Fibril

The index of fibrillation (F.I.) is estimated as follows.

Samples of the fibers are aligned according to the increase degree of fibrillation.

A standard length of each sample fiber is measured, counted the number of fibril according to the standard length, measured length of each fibril, calculated the mean of the length of fibril, and then, evaluate the value which obtained by multiple the number of fibril by the mean of the length of fibril as a index of fibrillation over each fiber.

The fiber having the highest among the indexes of fibrillation is the most fibrillated fiber. And the value obtained the index of fibrillation by 10 counts as a voluntary value.

The fiber which is not fibrillated overall counts as the fiber the index of fibrillation is zero, and then, other fibers is aligned according to the above obtained voluntary value in the range of 1 to 10.

EXAMPLE 1

A cellulose sheet that the weight mean degree of polymerization is 1,000 were fed into a pulverizer having a 100 mesh filter to produce cellulose powder having a particle size of less than 500 micrometers, and then, the cellulose powder were dissolved in NMMO to produce a NMMO solution containing cellulose of 1% by weight.

The NMMO solution containing the cellulose of 1% by weight was fed into an extruder (4) maintained its inner temperature at 78° C. through a geared pump at the speed of 6,900 g/hour and the cellulose powder was fed into the extruder through a screw-type feeder at the speed of 853 g/hour. The extruder was controlled to swell the NMMO solution and the cellulose powder fully by controlling them dwelling for 0.1 to 3 minutes in the swelling zone of the extruder. And then, the temperature of each block of the dissolving zone of the extruder was maintained at the range of 90 to 95° C. and operated the screw of the extruder at 200 rpm so as to extrude the fully melted solution through the nozzle of the extruder.

The concentration of the obtained solution is 11% by weight and doesn't contain cellulose particles which are not dissolved in the solution. And the degree of polymerization of the cellulose is 945.

EXAMPLE 2

A cellulose sheet that the weight mean degree of polymerization is 1,000 were fed into a pulverizer having a 100 mesh filter to produce cellulose powder having a particle size of less than 500 micrometers, and then, the cellulose powder were dissolved in NMMO to produce a NMMO solution containing cellulose of 2% by weight. The NMMO solution containing the cellulose of 2% by weight was fed into an extruder maintained its inner temperature at 78° C. through a geared pump at the speed of 6,900 g/hour and the cellulose powder was fed into the extruder through a screw-type feeder at the speed of 853 g/hour. The extruder was controlled to swell the NMMO solution and the cellulose powder fully by controlling them dwelling for 0.5 to 3 minutes in the swelling zone of the extruder. And then, the temperature of each block of the dissolving zone of the extruder was maintained at the range of 90 to 95° C. and operated the screw of the extruder at 200 rpm so as to extrude the melted solution through the nozzle of the extruder.

The concentration of the obtained solution is 11% by weight and doesn't contain cellulose particles which are not dissolved in the solution. And the degree of polymerization of the cellulose is 930.

EXAMPLE 3

The solution was prepared in the same manner as described in Example 1 except that the temperature of the dissolving zone in the extruder was changed to 100° C.

Cellulose particles which were not dissolved were not nearly found in the solution. And the degree of polymerization of the cellulose is 900.

EXAMPLE 4

A cellulose sheet that the weight mean degree of polymerization is 1,000 were fed into a pulverizer having a 100 mesh filter to produce cellulose powder having a particle size of less than 500 micrometers, and then, the cellulose powder were dissolved in NMMO to produce a NMMO solution containing cellulose of 1% by weight.

The NMMO solution containing 1% by weight of cellulose and the cellulose powder were fed into a twin-screw type extruder so as to produce a cellulose solution having a final concentration of 11% by weight.

The temperature of the block of the twin-screw type extruder was maintained at 95° C., and the screw of the twin-screw type extruder is operated at 200 rpm so as to extrude the fully melted solution through the nozzle of the extruder.

The cellulose particles which were not dissolved were not nearly found in the obtained solution. And the degree of polymerization of the cellulose is 870.

COMPARATIVE EXAMPLE 1

The cellulose sheet having a weight mean degree of polymerization of 1,000 was pulverized into powder having a particle size of less than 500 micrometers using a pulverizer. And then, the obtained cellulose powder and liquid-state NMMO (monohydrate) having a temperature of 89° C. were fed into a twin-screw type extruder, and dissolved while maintaining each block of the extruder at a temperature of 95° C. so as to extrude the fully melted solution through the nozzle of the extruder.

The concentration of the obtained solution is 11% by weight. There exist some non-dissolved particles having 50 to 100 micrometer size when viewed through a polarization microscope. The degree of polymerization of the cellulose was 740.

TABLE 1

|  | EX-AMPLE 1 | EX-AMPLE 2 | EX-AMPLE 3 | EX-AMPLE 4 | COMPARATIVE EXAMPLE 1 |
|---|---|---|---|---|---|
| Evaluation of non-dissolved particles[1] | 0 | 0 | 19 | 10 | 27 |
| mechanical tenacity at a dry state (g/d) | 7.5 | 7.6 | 6.9 | 7.1 | 4.4 |
| Elasticity at a dry state (g/d) | 310 | 298 | 267 | 273 | 190 |
| mechanical tenacity at a wet state (g/d) | 5.9 | 5.7 | 5.4 | 5.3 | 3.7 |
| index of fibrillation | 1 | 1 | 1 | 1 | 7 |

[1] the number of non-dissolved particles (in 5 × 5 mm²)

EXAMPLE 5

Polyvinylalcohol having a weight mean degree of polymerization of 1,700 and a saponification value of 99.5% were dissolved in NMMO to produce a NMMO solution containing polyvinylalcohol of 1% by weight.

Firstly, the NMMO solution containing polyvinylalcohol of 1% by weight was fed into a twin-screw type extruder having its inner temperature maintained at 78° C. through a geared pump at a speed of 6,900 g/hour. The cellulose sheet having a weight mean degree of polymerization of 1,200 was pulverized into cellulose powder having a particle size of less than 500 micrometer using a pulverizer having 100 mesh filter, and then, the cellulose powder was fed into the twin-screw type extruder through a screw-type feeder at the speed of 853 g/hour. Meanwhile, the liquid-state NMMO solution containing polyvinylalcohol of 1% by weight was fed into the extruder with it maintained at 74° C. And then, cellulose powder was fully swollen during the retention time of 8 to 10 minutes in the cellulose swelling zone of the extruder. Then the temperature of each block of the dissolving zone of the extruder was maintained at the range of 90 to 95° C. and operated the screw of the extruder at 200 rpm so as to extrude the fully melted solution through the nozzle of the extruder.

The concentration of the obtained solution is 11% by weight and doesn't contain cellulose particles which are not dissolved in the solution. And the degree of polymerization of the cellulose is 945.

EXAMPLE 6

Polyvinylalcohol having a weight mean degree of polymerization of 1,700 and a saponification value of 99.5% were dissolved in NMMO to produce a NMMO solution containing polyvinylalcohol of 2% by weight.

After that, the NMMO solution containing polyvinylalcohol of 2% by weight maintained at the temperature of 72° C. was fed into the top portion of a twin-screw type extruder maintained its inner temperature at 75° C. therein through a geared pump at the speed of 6,900 g/hour. The cellulose sheet having a weight mean degree of polymerization of 1,200 was pulverized into powder having a particle size of less than 500 micrometers using a pulverizer having 100 mesh filter, and then, the cellulose powder was fed into the twin-screw type extruder through a screw-type feeder at the speed of 853 g/hour. Cellulose powder was fully swollen during the retention time of 0.5 to 3 minutes in the cellulose swelling zone of the extruder. Then, each block of the dissolving zone in the extruder was maintained at 90 to 95° C. Then, the temperature of each block of the dissolving zone of the extruder was maintained at the range of 90 to 95° C. and operated the screw of the extruder at 200 rpm so as to extrude the fully melted solution through the nozzle of the extruder.

The concentration of the obtained solution is 11% by weight and doesn't contain cellulose particles which are not dissolved in the solution. And the degree of polymerization of the cellulose is 980.

EXAMPLE 7

The solution was prepared in the same manner as described in Example 6 except using Polyvinylalcohol having a weight mean degree of polymerization of 2,500 and a saponification value of 99%. The concentration of the obtained solution is 11% by weight and doesn't contain cellulose particles which are not dissolved in the solution. And the degree of polymerization of the cellulose is 950.

COMPARATIVE EXAMPLE 2

The cellulose sheet having a weight mean degree of polymerization of 1,200 was pulverized into powder having a particle size of less than 500 micrometers using a pulverizer. And then, the obtained cellulose powder and liquid-state NMMO (monohydrate) having a temperature of 89° C. were fed into a twin-screw type extruder, and dissolved while maintaining each block of the extruder at a temperature of 95° C. so as to extrude the fully melted solution through the nozzle of the extruder.

The concentration of the obtained solution is 11% by weight. There exist some non-dissolved particles having 50 to 100 micrometer size when viewed through a polarization microscope. The degree of polymerization of the cellulose was 740.

TABLE 2

|  | EX-AMPLE 5 | EX-AMPLE 6 | EXAMPLE 7 | COMPARATIVE EXAMPLE 2 |
|---|---|---|---|---|
| Evaluation of non-dissolved particles[1] | 0 | 0 | 0 | 27 |
| mechanical tenacity at a dry state (g/d) | 7.5 | 7.7 | 7.3 | 4.4 |

TABLE 2-continued

|  | EXAMPLE 5 | EXAMPLE 6 | EXAMPLE 7 | COMPARATIVE EXAMPLE 2 |
|---|---|---|---|---|
| elasticity at a dry state (g/d) | 310 | 298 | 267 | 182 |
| mechanical tenacity at a wet state (g/d) | 5.1 | 5.7 | 5.4 | 3.7 |
| index of fibrilation | 1 | 1 | 1 | 7 |

[1] the number of non-dissolved particles (in 5 × 5 mm$^2$)

INDUSTRIAL APPLICABILITY

This invention provides a method of preparing cellulose solution which is homogeneous at relatively low temperature by dissolving a small amount of cellulose powder or polyvinylalcohol in the liquid-state, concentrated NMMO solvent so as to lower the solidifying temperature of the NMMO. Because of the said effect, it is possible to feed the liquid-state NMMO into an extruder at relatively low temperature. Thereby, it can be possible to proceed the process at wide processing temperature and to produce cellulose solution which is homogeneous at relatively low temperature by swelling the cellulose powder and the NMMO solution at relatively low temperature so as not to form a film on the cellulose powder.

Also, it is possible to produce a cellulose fiber having a good flexibility and mechanical strength by using the cellulose solution that is homogeneous at relatively low temperature, when spinning by lowering thermal-degradation in the extruder while being maintained at high temperature.

The obtained fiber contains a small amount of polyvinylalcohol in the liquid-state, concentrated NMMO and has a good anti-fibrilation and excellent adhesive property.

This invention also provides a cellulose solution that minimized thermal-degradation and homogenized. The cellulose solution can be used to produce a cellulose-made article such as fiber, filament, film, tube, etc. More specifically, the fiber manufactured by using the above cellulose solution is excellent in mechanical strength and dimensional stability and may be used for making industrial filament fiber or reinforcing material of rubber-made products such as tire or belt.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of preparing cellulose solution, comprising the steps of:
    (A) dissolving cellulose powder in a liquid-state, concentrated N-methylmorpholine-N-oxide (NMMO) solution to provide cellulose-containing NMMO solution containing 0.01 to 3 wt % cellulose with respect to the total weight of the cellulose-containing NMMO solution, wherein the concentrated NMMO solution contains 10 to 18 wt % water with respect to the total weight of the NMMO solution; and
    (B) feeding the cellulose-containing NMMO solution and additional cellulose powder into an extruder having a screw wherein the cellulose-containing NMMO solution and additional cellulose powder are subjected to dispersing, mixing, shearing, kneading, melting and measuring processes in the extruder so as to produce cellulose solution that is swollen and homogenized.

2. The method of claim 1, wherein the cellulose powder used in the step (A) has a particle size of less than 5,000 micrometer.

3. The method of claim 1, the cellulose solution is produced continuously without attaching an extra water-vaporizer to the extruder in the step (B).

4. The method of claim 1, wherein the additional cellulose powder used in the step (B) has a particle size of less than 5,000 micrometer.

5. The method of claim 1, wherein the cellulose solution obtained by mixing, swelling and dissolving in the extruder in the step (B) contains 3 to 20% by weight of the cellulose with respect to the total weight of the cellulose solution.

6. The method of claim 1, wherein the cellulose-containing NMMO solution from step (A) is fed into the extruder while being maintained at 40 to 90° C. in the step (B).

7. The method of claim 1, wherein the extruder used in the step (B) is twin-axis extruder, and has 3 to 16 barrels or 12 to 64 L/D (length/diameter) of the screw.

8. The method of claim 7, wherein the twin-axis extruder is operated with it maintained at the temperature ranging from 30 to 110° C.

9. The method of claim 1, wherein the cellulose powder mixed with other polymer(s) is used in the steps (A) or (B).

* * * * *